US009928162B2

(12) United States Patent
Brealey et al.

(10) Patent No.: US 9,928,162 B2
(45) Date of Patent: Mar. 27, 2018

(54) IDENTIFYING SEVERITY OF TEST EXECUTION FAILURES BY ANALYZING TEST EXECUTION LOGS (71) Applicant: International Business Machines Corporation, Armonk, NY (US)

(72) Inventors: Christopher L. Brealey, Markham (CA); Shinoj Zacharias, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 305 days.

(21) Appl. No.: 14/671,141

(22) Filed: Mar. 27, 2015

(65) Prior Publication Data
US 2016/0283344 A1 Sep. 29, 2016

(51) Int. Cl.
G06F 11/36 (2006.01)
G06F 11/30 (2006.01)
G06F 11/34 (2006.01)
G06F 11/07 (2006.01)

(52) U.S. Cl.
CPC ...... *G06F 11/3692* (2013.01); *G06F 11/0781* (2013.01); *G06F 11/0766* (2013.01); *G06F 11/0778* (2013.01); *G06F 11/302* (2013.01); *G06F 11/3065* (2013.01); *G06F 11/3409* (2013.01); *G06F 11/3636* (2013.01); *G06F 11/3688* (2013.01)

(58) Field of Classification Search
CPC ....................... G06F 11/36–11/3696
USPC .................................. 717/127–135
See application file for complete search history.

(56) References Cited

U.S. PATENT DOCUMENTS

| 7,197,427 B2* | 3/2007 | Noonan | G06F 11/3409 |
| | | | 702/179 |
| 7,225,368 B2 | 5/2007 | Lancaster | |
| 7,346,812 B1 | 3/2008 | Wickeraad | |
| 7,739,374 B1* | 6/2010 | Frey | G06F 11/0709 |
| | | | 709/223 |
| 7,836,346 B1 | 11/2010 | Davidov et al. | |
| 8,195,983 B2 | 6/2012 | Celeskey et al. | |
| 8,359,580 B2 | 1/2013 | Gonzales et al. | |
| 8,463,760 B2* | 6/2013 | Himstedt | G06F 11/3672 |
| | | | 707/694 |
| 9,037,915 B2* | 5/2015 | D'Alterio | G06F 11/3692 |
| | | | 714/38.1 |

(Continued)

OTHER PUBLICATIONS

Administration and Configuration Guide: Configuring Logging and Debugging, Oracle, 2012, 10 pages, [retrieved on Apr. 14, 2017], Retrieved from the Internet: <URL:http://web.archive.org/web/20120111000239/http://docs.oracle.com/cd/E13157_01/wlevs/docs30/config_server/logging.html>.*

(Continued)

*Primary Examiner* — Geoffrey St Leger
(74) *Attorney, Agent, or Firm* — Christopher McLane; Daniel R. Simek (57) ABSTRACT

The method includes identifying a test report log for a regression test. The method further includes identifying one or more errors in the identified test report log. The method further includes determining a severity category for the one or more identified errors in the identified test report log. The method further includes determining a severity category for the identified test report log based on the determined severity category for the one or more identified errors in the identified test report log.

9 Claims, 3 Drawing Sheets

(56) References Cited

U.S. PATENT DOCUMENTS

| | | | |
|---|---|---|---|
| 9,292,423 B1 | 3/2016 | Doshi et al. | |
| 9,298,584 B2 | 3/2016 | Shehory | |
| 9,619,373 B2 | 4/2017 | Alexander et al. | |
| 2004/0015867 A1* | 1/2004 | Macko | G06F 11/3696 717/125 |
| 2005/0246207 A1* | 11/2005 | Noonan | G06F 11/3409 705/4 |
| 2007/0006037 A1 | 1/2007 | Sargusingh et al. | |
| 2007/0174709 A1* | 7/2007 | Sluiman | G06F 11/28 714/38.14 |
| 2008/0141226 A1* | 6/2008 | Girouard | G06F 11/3636 717/128 |
| 2008/0222501 A1 | 9/2008 | Travison et al. | |
| 2008/0294670 A1* | 11/2008 | Borissov | G06F 11/3664 |
| 2009/0222492 A1* | 9/2009 | Yamauchi | G06F 11/3476 |
| 2010/0057693 A1* | 3/2010 | Himstedt | G06F 11/3672 707/E17.005 |
| 2010/0131450 A1 | 5/2010 | Nguyen et al. | |
| 2011/0093833 A1* | 4/2011 | Kierans | G06Q 10/06 717/101 |
| 2011/0154293 A1* | 6/2011 | Dharwada | G06F 8/77 717/125 |
| 2012/0324424 A1* | 12/2012 | Breeds | G06F 11/3676 717/110 |
| 2013/0151906 A1* | 6/2013 | D'Alterio | G06F 11/3684 714/38.1 |
| 2013/0311977 A1 | 11/2013 | Mikko Nieminen et al. | |
| 2014/0351796 A1* | 11/2014 | Gur-esh | G06F 11/3604 717/126 |
| 2016/0283365 A1 | 9/2016 | Brealey et al. | |

OTHER PUBLICATIONS

Elbaum, S., et al., Incorporating varying test costs and fault severities into test case prioritization, Proceedings of the 23rd International Conference on Software Engineering, 2001, pp. 329-338, [retrieved on May 2, 2017], Retrieved from the Internet: <URL:http://ieeexplore.ieee.org/>.*

Caseley, P. R., et al., Assessing the effectiveness of static code analysis, The First Institution of Engineering and Technology International Conference on System Safety, 2006, pp. 227-237, [retrieved on May 2, 2017], Retrieved from the Internet: <URL:http://ieeexplore.ieee.org/>.*

Guo, P. J., et al., Characterizing and predicting which bugs get fixed: an empirical study of Microsoft Windows, ACM/IEEE 32nd International Conference on Software Engineering, 2010, pp. 495-504, [retrieved on May 2, 2017], Retrieved from the Internet: <URL:http://ieeexplore.ieee.org/>.*

Chan, et al., "Automatic goal-oriented classification of failure behaviors for testing XML-based multimedia software applications: An experimental case study", Postprint of article in the Journal of Systems and Software 79 (5): 602-612 (2006), HKU CS Tech Report TR-2005-04.

"Load Test Analyzer Overview", Visual Studio 2013, MSDN Library, Downloaded Jan. 29, 2015, <http://msdn.microsoft.com/en-us/library/ms404677.aspx#AnalyzeComp>.

"Log Analysis for Testing", XpoLog Center for Testing, Copyright 2003-2014 XpoLog Ltd., Downloaded Jan. 29, 2015, <http://www.xpolog.com/home/solutions/testing.jsp>.

Li, et al., "Hadoop Performance Diagnosis by Post-execution Log Analysis", downloaded Jan. 29, 2015.

Brealey et al., "Identifying Severity of Test Execution Failures by Analyzing Test Execution Logs", U.S. Appl. No. 15/098,478, filed Apr. 14, 2016, 21 pages.

Appendix P, List of IBM Patents or Patent Applications Treated as Related, 2 pages, dated Apr. 19, 2016.

"Administration and Configuration Guide: Configuring Logging and Debugging", Oracle, 2012, 10 pages, [retrieved on Apr. 14, 2017], Retrieved from the Internet: <URL:http://web.archive.org/web/20120111000239/http://docs.oracle.com/cd/E13157_01/wlevs/docs30/config_server/logging.html>.

Elbaum, S., et al., "Incorporating varying test costs and fault seventies into test case prioritization", Proceedings of the 23rd International Conference on Software Engineering, 2001, pp. 329-338, [retrieved on May 2, 2017], Retrieved from the Internet:<URL:http://ieeexplore.ieee.org/>.

Caseley, P. R., et al., "Assessing the effectiveness of static code analysis", The First Institution of Engineering and Technology International Conference on System Safety, 2006, pp. 227-237, [retrieved on May 2, 2017], Retrieved from the Internet:<URL:http://ieeexplore.ieee.org/>.

Guo, P. J., et al., "Characterizing and predicting which bugs get fixed: an empirical study of Microsoft Windows", ACM/IEEE 32nd International Conference on Software Engineering, 2010, pp. 495-504, [retrieved on May 2, 2017], Retrieved from the Internet:<URL:http://ieeexplore.ieee.org/>.

Brealey et al., "Identifying Severity of Test Execution Failures by Analyzing Test Execution Logs", U.S. Appl. No. 15/727,842, filed Oct. 9, 2017, 21 pages.

Brealey et al., "Identifying Severity of Test Execution Failures by Analyzing Test Execution Logs", U.S. Appl. No. 15/727,888, filed Oct. 9, 2017, 21 pages.

Appendix P, List of IBM Patents or Patent Applications Treated As Related, 2 pages, dated Oct. 10, 2017.

\* cited by examiner

IDENTIFYING SEVERITY OF TEST EXECUTION FAILURES BY ANALYZING TEST EXECUTION LOGS

BACKGROUND OF THE INVENTION

The present invention relates generally to test execution logs, and more particularly to analyzing test execution logs System testing of software or hardware is conducted on a complete, integrated system to evaluate the system's compliance with its specified requirements. System testing takes the "integrated" software components that have passed integration testing and also the software system itself integrated with any applicable hardware system(s). The purpose of integration testing is to detect any inconsistencies between the software units that are integrated together (called assemblages) or between any of the assemblages and the hardware. System testing is a more limited type of testing; it seeks to detect defects both within the "inter-assemblages" and also within the system as a whole.

System testing is performed on the entire system in the context of a Functional Requirement Specification(s) (FRS) and/or a System Requirement Specification (SRS). System testing tests not only the design but also the behavior and even the believed expectations of the customer. It is also intended to test up to and beyond the bounds defined in the software/hardware requirements specification(s).

SUMMARY

Embodiments of the present invention disclose a method, computer program product, and system for determining severity of execution test failures. In one embodiment, in accordance with the present invention, the computer-implemented method includes identifying a test report log for a regression test. The method further includes identifying one or more errors in the identified test report log. The method further includes determining a severity category for the one or more identified errors in the identified test report log. The method further includes determining a severity category for the identified test report log based on the determined severity category for the one or more identified errors in the identified test report log.

DETAILED DESCRIPTION

Implementation of embodiments of the invention may take a variety of forms, and exemplary implementation details are discussed subsequently with reference to the Figures.

Figure 1:
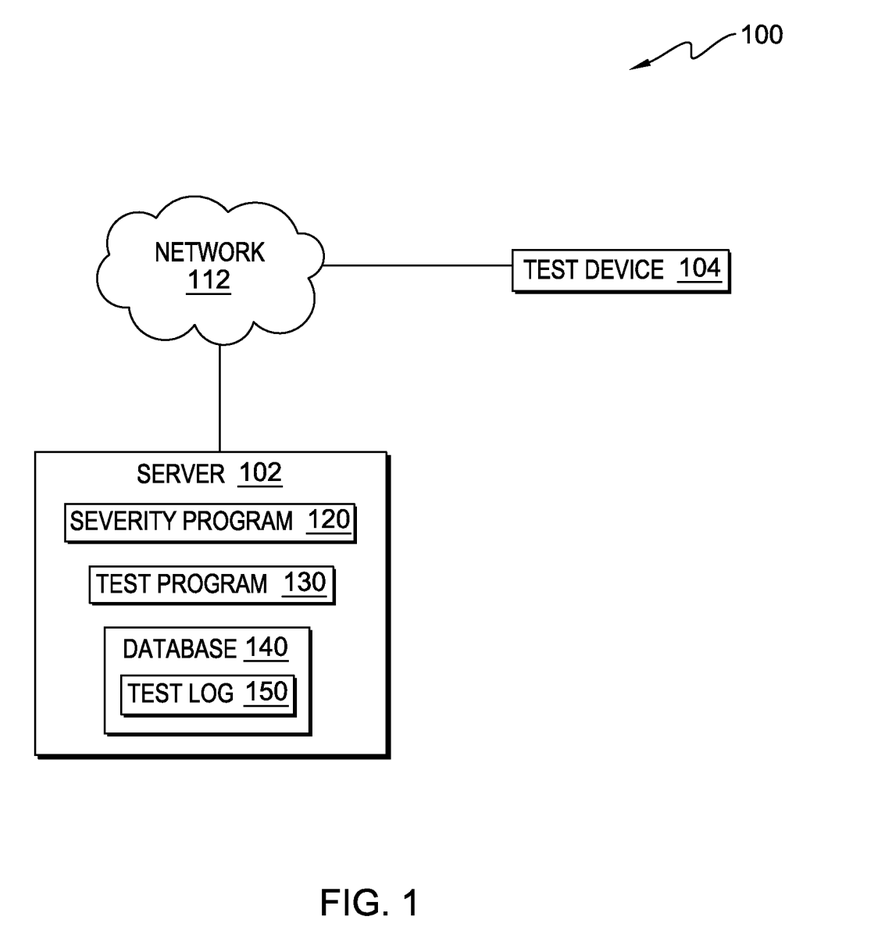
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 102, connected to network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, server 102 is one or more of a management server, a web server, or any other electronic device or computing system capable of receiving, analyzing, and sending data. In this embodiment, server 102 identifies test execution logs and determines the severity of failures in the test execution logs. In other embodiments, server 102 represents a server computing system utilizing multiple computers as a server system, such as in a cloud computing environment. In another embodiment, server 102 represents a laptop computer, a tablet computer, a netbook computer, a personal computer (PC), a desktop computer, a personal digital assistant (PDA), a smart phone, or any programmable electronic device capable of communicating with network 112. In another embodiment, server 102 represents a computing system utilizing clustered computers and components to act as a single pool of seamless resources. Server 102 may include components, as depicted and described in further detail with respect to FIG. 3, in accordance with embodiments of the present invention. Server 102 includes severity program 120, test program 130, and database 140.

In depicted distributed data processing environment 100, severity program 120 resides on server 102 and determines the severity of test log failures. In various embodiments, severity program 120 monitors an execution report/playback log of a test execution to identify failures and determine a severity of any failures. In some embodiments, severity program 120 may monitor test execution logs on server 102, or another computing device, via network 112. In an example, another computing device (not depicted) may have a test program which is monitored by severity program 120. In another embodiment, severity program 120 may monitor databases and/or storage devices located on server 102 or another computing device to identify test execution logs. In some embodiments, severity program 120 monitors multiple test programs (e.g., test program 130) to identify failures in a test execution log. Severity program 120 is depicted and described in further detail with respect to FIG. 2.

In depicted distributed data processing environment 100, test program 130 resides on server 102 and tests new hardware, software, etc. In various embodiments, test program 130 preforms multiple regression tests on new products, such as hardware, software, etc. In some embodiments, test program 130 creates a log after a regression test, which includes results of the test such as pass or fail and also each step of the test. In an embodiment, test program 130 may store test logs in database 140. In another embodiment, test program 130 is located on another computing device (not depicted) and sends test logs to severity program 120 via network 112.

In the depicted embodiment, database 140 resides on server 102. In another embodiment, database 140 may reside elsewhere in distributed data processing environment 100, such as within one or more additional server(s) (not shown), or independently as a standalone database that is capable of communicating with server 102 via network 112. A database is an organized collection of data. Database 140 is implemented with any type of storage device capable of storing data that is accessed and utilized by server 102, such as a database server, a hard disk drive, or a flash memory. In other embodiments, database 140 represents multiple storage devices within server 102. Database 140 stores information, such as execution test logs, user presets, severity categories, test reports, etc. In an example, database 140 stores information generated by test program 130, such as test log 150. Database 140 includes test log 150.

In the depicted embodiment, test log 150 resides in database 140. Test log 150 is a log of steps of a test run by test program 130, which has been stored in database 140. In some embodiments, test log 150 may contain steps of a test as well as the outcome of the step comprising pass and fail. Test log 150 can be any type of test execution, such as functional, performance, accessibility, a unit testing framework, race, debug, etc. Test log 150 may contain all information related to a test, such as executed code and commands which have been entered.

In the depicted embodiment, test device 104 is one or more of a desktop computer, a laptop computer, a tablet computer, a specialized computer server, a smart phone, or any programmable electronic device capable of communicating with server 102 via network 112 and with various components and devices within distributed data processing environment 100. In general, test device 104 represents any programmable electronic device or combination of programmable electronic devices capable of executing machine readable program instructions and communicating with other computing devices via a network, such as network 112. Test device 104 may include components as depicted and described in further detail with respect to FIG. 3, in accordance with embodiments of the present invention. In an embodiment, test device 104 receives test information from test program 130 via network 112 to test hardware, software, etc., and stores the results of the tests in a database, such as database 140. In an example, test device 104 sends the results (e.g., test log 150) of a test on new software to database 140 via network 112.

Figure 2:
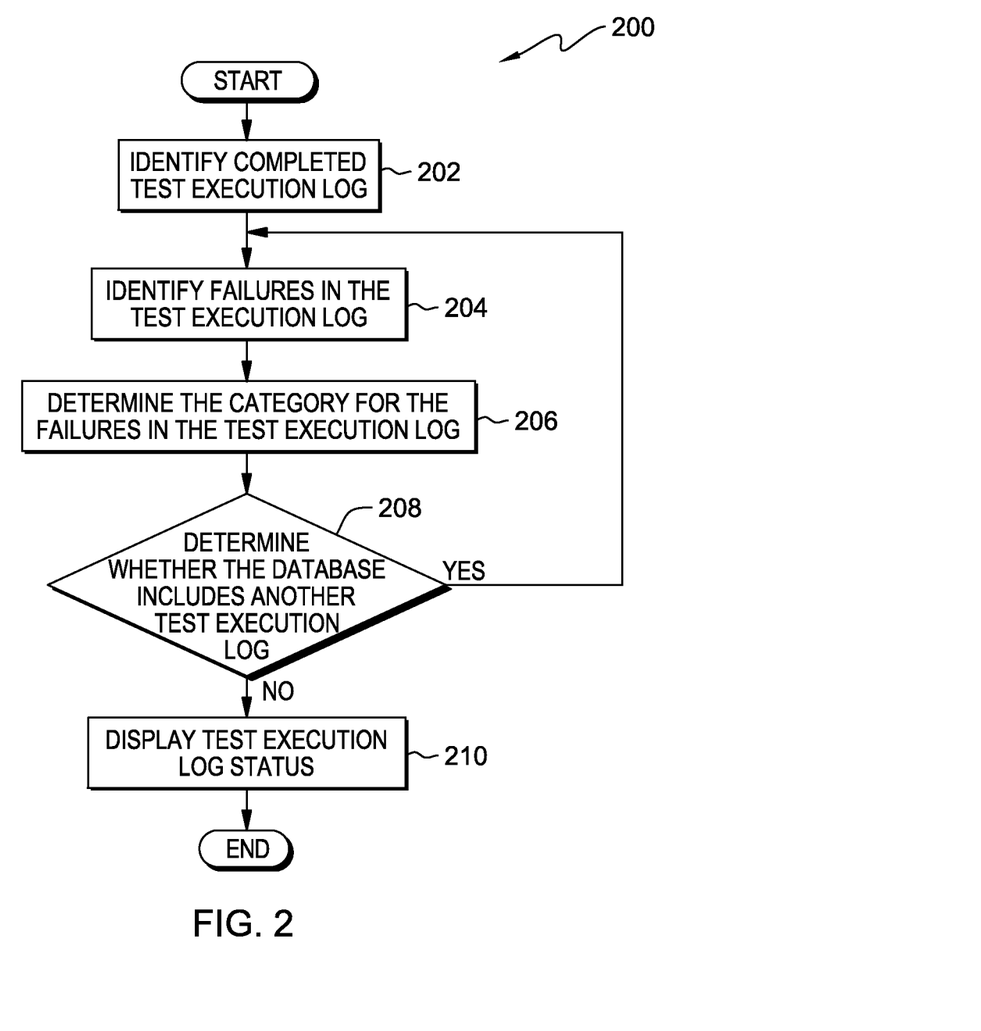
FIG. 2 is a flowchart depicting operational steps of a program for determining the severity of test log failures within the distributed data processing environment of FIG. 1, in accordance with an embodiment of the present invention.

FIG. 2 is a flowchart depicting operational steps of program 200, which is a function of severity program 120, in accordance with an embodiment of the present invention. Program 200 operates on server 102 and determines the severity of failures in test logs. In various embodiments, program 200 manages multiple databases to review test logs stored in the databases. In one embodiment, an administrator initiates the operational steps of program 200 to review test logs. In another embodiment, severity program 120 may initiate the operational steps of program 200 any time a new test log is stored. In yet another embodiment, the operational steps of program 200 may initiate at preset time intervals.

Program 200 identifies a completed test execution log (step 202). In various embodiments, program 200 continuously searches a test log database (e.g., database 140) for a completed test execution log (e.g., test log 150) that has not already been reviewed. In other embodiments, program 200 may receive a test log directly from a test device (e.g., test device 104). In yet other embodiments, program 200 may be notified by a test program (e.g., test program 130) when a test has been completed. Program 200 may then search a database (e.g., database 140) for new test logs. In an example, program 200 receives a notification from test program 130 when a test has been completed, and then test program 200 identifies the newly completed test.

Program 200 identifies failures in the test execution log (step 204). In various embodiments, program 200 reviews a test execution log (e.g., test log 150) to identify failures. In an example, program 200 identifies a failure, such as object not found or verification point failed within the test execution log. In another example, program 200 reviews a test execution log (e.g., test log 150) and determines that the test execution log only has a few bites of data, which may indicate that the test failed to run. In some embodiments, program 200 analyzes the entire test log to determine how many failures have been reported and the types of failures reported. In one example, the test execution log (e.g., test log 150) displays a notification if there is a failure during a test. In an embodiment, program 200 may determine no failures occurred and skip to step 208. In other embodiments, program 200 may identify multiple failures or that a test failed to run. In some embodiments, program 200 identifies each failure and the reason for the failure, such as a warning during a specific step. In other embodiments, program 200 will not identify redundant errors or failures as they may end up in a similar category.

Program 200 determines a category for the failures in a test execution log (step 206). In various embodiments, program 200 analyzes the identified test failures and determines one or more categories that correspond to the identified failures. For example, program 200 determines that test log 150 includes only one failure in test log 150, but the failure was the test did not start execution. In this example, program 200 would determine which preset category the failure belongs in. Program 200 may determine that because the test failed to run, the failure should be in the most severe category. In some embodiments, severity program 120 utilizes preset values for each category comprising of thresholds for various possible failures. In one embodiment, severity program 120 may prompt users with a possible failure and request a threshold number of the possible failure for each category.

In various embodiments, program 200 analyzes test execution logs or trace logs (e.g., test log 150) based on the set of rules defined by project/product team, administrators of severity program 120, company policy, etc. In an embodiment, program 200 can categorize the test execution logs based on the preset categories and assign a severity category to each test execution log and the test execution logs status of completion. In some embodiments, program 200 may determine categories based at least in part on the type of test being run (e.g., execution logs or trace/debug logs). In some embodiments, program 200 may categorize the severity of each failure, error, warning, etc. and not just the entire test log. In some embodiments, program 200 analyzes a test log to determine the percent of completion. In an example, a test log has 20 steps, but only 10 were performed successfully. In this example, the percentage of completion is 50 percent.

In some embodiments, the one or more categories for a test failure may include multiple failures making up each category. Some examples may include:

Severity Level 1

Possible reasons for level one include: the test has failed to start the execution; all the steps in the test failed to execute; the test execution has resulted in application crash (identified by exceptions in the log); the percentage of a unit testing framework methods failure is greater than the maximum acceptable limit; performance counters for the test are greater than maximum acceptable limit; number of user interfaces without proper accessibility is greater than the threshold value; the trace and debug log files has fatal type messages being reported.

Severity Level 2

Possible reasons for level two include: the percentage of steps failed in the test are greater than the maximum acceptable limit without any application crash or hung; the percentage of a unit testing framework method failures is greater than the maximum acceptable limit; the performance counters for the test are greater than the acceptable limit; the number of user interfaces without proper accessibility is greater than the threshold value; the trace and debug log files have error type messages being reported.

Severity Level 3

Possible reasons for level three include: the test is executed successfully but the test has verification/checkpoint failures; the percentage of a unit testing framework method failures is greater than the maximum acceptable limit; the performance counters for the test are greater than the acceptable limit; the number of user interfaces without proper accessibility are greater than the threshold value; the trace and debug log files have warning type messages being reported.

Severity Level 4

Possible reasons for level four include: the test has passed successfully without any failures but with warnings; the performance counters for the test are greater than the acceptable limit; the number of user interfaces without proper accessibility is greater than the threshold value; the trace and debug log files have information type messages being reported.

Program 200 determines whether the database includes another test execution log (decision 208). In various embodiments, program 200 determines whether another test log exists to review, which is associated with the previously reviewed test log. In an example, the same piece of hardware is being tested via two different test programs. The two test logs may be flagged or marked to indicate that the test logs should be reviewed together. In another embodiment, program 200 may categorize each test failure in a test log, and program 200 determines whether more test failures should be analyzed.

If program 200 determines that the database does not include another test execution log (no branch, decision 208), then program 200 displays the test log status (step 210). In various embodiments, program 200 displays the execution status of a test log as well as the severity/category of the status. In an example, a test may have failed, and program 200 determined that the failure comprised a level two failure. In this example, program 200 may present a display to a user or administrator, such as "Failed S2." In some embodiments, the status and severity may be used to derive a functional quality measurement for the test as well as help identify the impact of the changes delivered in the test. In one embodiment, program 200 may send a notification to a user and/or administrator containing the status and severity of test results.

If program 200 determines that the database includes another test execution log (yes branch, decision 208), program 200 proceeds to step 204. In an embodiment, program 200 determines that another test or failure exists to analyze, and program 200 identifies the failures in the test execution log. In various embodiments, program 200 continues to analyze tests and failures until all associated tests and failures have been analyzed and categorized.

Figure 3:
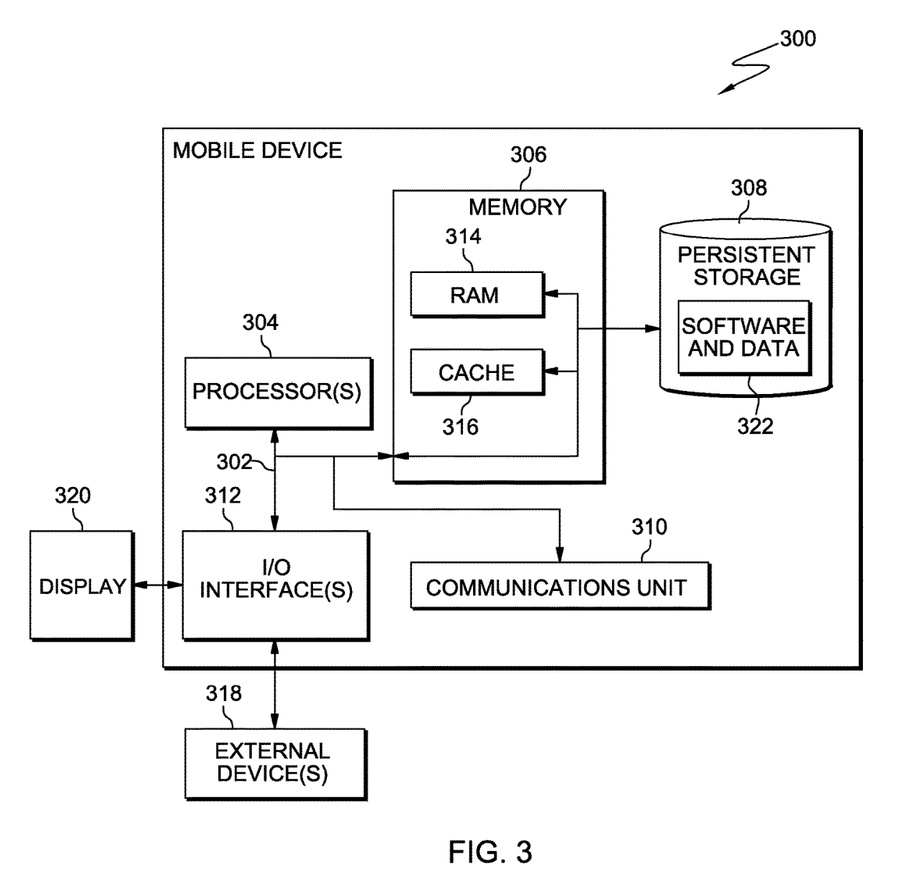
FIG. 3 depicts a block diagram of components of a test device and a server of FIG. 1, in accordance with an embodiment of the present invention.

FIG. 3 depicts a block diagram of components of computer 300, which is representative of server 102 and test device 104, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media. Software and data 322 are stored in persistent storage 308 for access and/or execution by processor(s) 304 via one or more memories of memory 306. With respect to server 102, software and data 322 represents severity program 120 and database 140.

In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface(s) 312 may provide a connection to external device(s) 318 such as a keyboard, a keypad, a touch screen, and/or some other suitable input device. External device(s) 318 can also include portable computer readable storage media such as, for example, thumb drives, portable optical or magnetic disks, and memory cards. Software and data 322 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining severity of execution test failures, the method comprising:
   identifying, by one or more computer processors, a test report log from a regression test;
   identifying, by one or more computer processors, one or more errors in the identified test report log;
   determining, by one or more computer processors, a severity category for the one or more identified errors in the identified test report log; and
   determining, by one or more computer processors, a severity category for the identified test report log based on the determined severity category for the one or more identified errors in the identified test report log wherein determining a severity category for the identified test report log comprises:
      determining, by one or more computer processors, if the regression test executed successfully but the regression test has checkpoint failures;
      assigning, by one or more computer processors, a severity category to the identified test report log based upon the checkpoint failures;
      identifying, by one or more computer processors, a warning associated with the one or more errors in the identified test report log;
      identifying, by one or more computer processors, a previous test report log with a similar warning associated with the identified one or more errors in the identified test report log;
      assigning, by one or more computer processors, a severity category assigned to the previous test report log to the identified test report log;
      identifying, by one or more computer processors, at least one preset error message that matches an error message included in the identified test report log and corresponds to a plurality of severity categories;
      determining, by one or more computer processors, a severity category from a plurality of severity categories that includes a most identical preset error message in relation to error messages in the identified test report log;
      identifying, by one or more computer processors, one or more messages for trace and bug log files;
      assigning, by one or more computer processors, a severity category, from a plurality of severity categories, to the identified test report log based on the identified one or more messages for trace and bug log files;
      and
      determining, by one or more computer processors, a severity category for the identified test report log based on the determined severity category for the one or more identified errors in the identified test report log.

2. The method of claim 1, wherein determining a severity category for the identified test report log, further comprises:
   determining, by one or more computer processors, a percentage completion that corresponds to the identified test report log based on the identified one or more errors; and
   assigning, by one or more computer processors, a severity category, from a plurality of severity categories, to the identified test report log based on the determined percentage completion.

3. The method of claim 1, wherein determining a severity category for the identified test report log, further comprises:
   identifying, by one or more computer processors, a number of user interfaces without proper accessibility; and
   assigning, by one or more computer processors, a severity category, from a plurality of severity categories, to the identified test report log based on the determined identified number of user interfaces without proper accessibility.

4. A computer program product for determining severity of execution test failures, the computer program product comprising:
   one or more computer readable storage media and program instructions stored on the one or more computer readable storage media, the program instructions comprising:
   program instructions to identify a test report log for a regression test;
   program instructions to identify one or more errors in the identified test report log;
   program instructions to determine a severity category for the one or more identified errors in the identified test report log; and
   program instructions to determine a severity category for the identified test report log based on the determined severity category for the one or more identified errors in the identified test report log wherein determining a severity category for the identified test report log comprises:
      program instructions to determine if the regression test executed successfully but the regression test has checkpoint failures;
      program instructions to assign a severity category to the identified test report log based upon the checkpoint failures;
      program instructions to identify a warning associated with the one or more errors in the identified test report log;
      program instructions to identify a previous test report log with a similar warning associated with the identified one or more errors in the identified test report log;
      program instructions to assign a severity category assigned to the previous test report log to the identified test report log;
      program instructions to identify at least one preset error message that matches an error message included in the identified test report log and corresponds to a plurality of severity categories;
      program instructions to determine a severity category from a plurality of severity categories that includes a most identical preset error message in relation to error messages in the identified test report log;
      program instructions to identify one or more messages for trace and bug log files;
      program instructions to assign a severity category, from a plurality of severity categories, to the identified test report log based on the identified one or more messages for trace and bug log files; and program instructions to determine a severity category for the identified test report log based on the determined severity category for the one or more identified errors in the identified test report log.

5. The computer program product of claim 4, wherein program instructions to determine a severity category for the identified test report log further comprises program instructions to:

determine a percentage completion that corresponds to the identified test report log based on the identified one or more errors; and assign a severity category, from a plurality of severity categories, to the identified test report log based on the determined percentage completion.

6. The computer program product of claim 4, wherein program instructions to determine a severity category for the identified test report log further comprises program instructions to:

identify a number of user interfaces without proper accessibility; and assign a severity category, from a plurality of severity categories, to the identified test report log based on the determined identified number of user interfaces without proper accessibility.

7. A computer system for determining severity of execution test failures, the computer system comprising:

one or more computer processors;
one or more computer readable storage media;
program instructions stored on the computer readable storage media for execution by at least one of the one or more computer processors, the program instructions comprising:

program instructions to identify a test report log for a regression test;

program instructions to identify one or more errors in the identified test report log;

program instructions to determine a severity category for the one or more identified errors in the identified test report log; and program instructions to determine a severity category for the identified test report log based on the determined severity category for the one or more identified errors in the identified test report log wherein determining a severity category for the identified test report log comprises:

program instructions to determine if the regression test executed successfully but the regression test has checkpoint failures;

program instructions to assign a severity category to the identified test report log based upon the checkpoint failures;

program instructions to identify a warning associated with the one or more errors in the identified test report log;

program instructions to identify a previous test report log with a similar warning associated with the identified one or more errors in the identified test report log;

program instructions to assign a severity category assigned to the previous test report log to the identified test report log;

program instructions to identify at least one preset error message that matches an error message included in the identified test report log and corresponds to a plurality of severity categories;

program instructions to determine a severity category from a plurality of severity categories that includes a most identical preset error message in relation to error messages in the identified test report log;

program instructions to identify one or more messages for trace and bug log files;

program instructions to assign a severity category, from a plurality of severity categories, to the identified test report log based on the identified one or more messages for trace and bug log files; and program instructions to determine a severity category for the identified test report log based on the determined severity category for the one or more identified errors in the identified test report log.

8. The computer system of claim 7, wherein program instructions to determine a severity category for the identified test report log further comprises program instructions to:

determine a percentage completion that corresponds to the identified test report log based on the identified one or more errors; and assign a severity category, from a plurality of severity categories, to the identified test report log based on the determined percentage completion.

9. The computer system of claim 7, wherein program instructions to determine a severity category for the identified test report log further comprises program instructions to:

identify a number of user interfaces without proper accessibility; and assign a severity category, from a plurality of severity categories, to the identified test report log based on the determined identified number of user interfaces without proper accessibility.

* * * * *